(12) United States Patent
Krug

(10) Patent No.: US 9,203,241 B2
(45) Date of Patent: Dec. 1, 2015

(54) METHOD FOR CONTROLLING THE STABILITY OF AN ELECTRIC SUPPLY GRID

(75) Inventor: Florian Krug, München (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 393 days.

(21) Appl. No.: 13/698,677

(22) PCT Filed: May 13, 2011

(86) PCT No.: PCT/EP2011/057770
§ 371 (c)(1),
(2), (4) Date: Jan. 11, 2013

(87) PCT Pub. No.: WO2011/144529
PCT Pub. Date: Nov. 24, 2011

(65) Prior Publication Data
US 2013/0116845 A1 May 9, 2013

(30) Foreign Application Priority Data

May 19, 2010 (DE) .......................... 10 2010 021 070

(51) Int. Cl.
*G05D 3/12* (2006.01)
*G05D 5/00* (2006.01)
(Continued)

(52) U.S. Cl.
CPC ... *H02J 3/14* (2013.01); *H02J 3/24* (2013.01); *H02J 3/381* (2013.01); *H02J 3/382* (2013.01); *H02J 3/383* (2013.01); *H02J 3/386* (2013.01); *Y02E 10/563* (2013.01); *Y02E 10/763* (2013.01)

(58) Field of Classification Search
CPC .............. Y02T 10/642; Y02T 10/7005; Y02T 10/7038; Y02T 10/7044; Y02T 10/7072; Y02T 10/7077; Y02T 10/7088; Y02T 10/7283; Y02T 90/128; Y02T 90/162; Y02T 90/163; B60L 3/0046; B60L 3/12; B60L 8/003; B60L 11/1838; B60L 11/1842; B60L 11/1844; B60L 11/1851; B60L 11/1862; B60L 2230/16; B60L 2240/62; B60L 2240/622; B60L 2240/72; B60L 2250/16; B60L 2260/52; Y04S 10/126; Y04S 10/54; Y04S 20/221; Y04S 40/121; Y04S 40/126; Y04S 50/10; H02J 2003/003; H02J 2003/007; H02J 3/383; H02J 3/386; H02J 7/0027; G06Q 10/00; Y02E 10/563; Y02E 10/566; Y02E 10/763; Y02E 40/72; Y02E 60/721; Y02E 60/7815; B60W 10/26; B60W 2510/244; B60W 2550/402; Y02B 70/3216; Y02B 90/2607; H04W 64/00; G01C 21/3676; H04L 41/12; F05B 2270/337

USPC ............... 700/286, 291, 295–297; 701/2, 22, 701/23–26, 29.1, 29.3, 29.4, 31.4, 31.5, 701/32.3, 32.4, 33.4; 702/57, 60–63; 705/63, 412; 180/65.1; 307/9.1, 10.1, 307/43, 69, 80; 340/636.1, 988–994

See application file for complete search history.

(56) References Cited

U.S. PATENT DOCUMENTS 6,864,807 B2 * 3/2005 Todoriki et al. ............... 340/988
7,747,739 B2 * 6/2010 Bridges et al. ................ 709/224
(Continued)

FOREIGN PATENT DOCUMENTS

CN 101542864 A 9/2009
CN 101678774 A 3/2010
(Continued)

*Primary Examiner* — Crystal J Barnes-Bullock

(57) ABSTRACT

A method for controlling the stability of an electric supply grid is provided. A first device, designed to exchange electrical energy with the supply grid, locates a part of the supply grid, with which the first device is associated for an energy connection, by a geographic location of the first device. The first device determines parameters for an intended energy exchange. At least one second device associated with the part of the supply grid for energy exchange also determines parameters for an intended energy exchange. The first device performs the energy exchange considering the parameters of the first and the second device such that an electric stability of the part of the supply grid is ensured.

12 Claims, 1 Drawing Sheet

(51) Int. Cl.
  *G05D 9/00* (2006.01)
  *G05D 11/00* (2006.01)
  *G05D 17/00* (2006.01)
  *G01M 17/00* (2006.01)
  *G06F 7/00* (2006.01)
  *G06F 19/00* (2011.01)
  *G01R 21/00* (2006.01)
  *G01R 31/36* (2006.01)
  *G08G 1/123* (2006.01)
  *H02J 3/14* (2006.01)
  *H02J 3/24* (2006.01)
  *B60L 1/00* (2006.01)
  *B60L 3/00* (2006.01)
  *H02G 3/00* (2006.01)
  *H02J 3/38* (2006.01)

(56) References Cited

U.S. PATENT DOCUMENTS

| | | | |
|---|---|---|---|
| 7,991,665 B2 * | 8/2011 | Hafner et al. | 705/35 |
| 8,019,483 B2 * | 9/2011 | Keefe | 700/286 |
| 8,237,301 B2 * | 8/2012 | Delmerico et al. | 290/44 |
| 8,305,032 B2 * | 11/2012 | McKenna | 320/104 |
| 8,319,358 B2 * | 11/2012 | Curry et al. | 290/1 A |
| 8,371,405 B2 * | 2/2013 | Ortmann et al. | 180/65.1 |
| 8,433,471 B2 * | 4/2013 | Christensen et al. | 701/29.1 |
| 8,796,881 B2 * | 8/2014 | Davis | 307/69 |
| 8,810,192 B2 * | 8/2014 | Bridges et al. | 320/107 |
| 8,898,278 B2 * | 11/2014 | Bridges et al. | 709/224 |
| 8,996,183 B2 * | 3/2015 | Forbes, Jr. | 700/291 |
| 2002/0103745 A1 | 8/2002 | Andren | |
| 2002/0128749 A1 * | 9/2002 | Arita et al. | 700/286 |
| 2005/0034023 A1 | 2/2005 | Maturana et al. | |
| 2007/0282495 A1 | 12/2007 | Kempton et al. | |
| 2009/0200988 A1 | 8/2009 | Bridges et al. | |
| 2009/0216387 A1 | 8/2009 | Klein | |
| 2009/0281673 A1 | 11/2009 | Taft | |
| 2010/0079004 A1 | 4/2010 | Keefe | |
| 2010/0217550 A1 * | 8/2010 | Crabtree et al. | 702/62 |
| 2010/0332373 A1 * | 12/2010 | Crabtree et al. | 705/37 |
| 2011/0004350 A1 * | 1/2011 | Cheifetz et al. | 700/276 |
| 2011/0010043 A1 * | 1/2011 | Lafky | 701/33 |
| 2011/0172837 A1 * | 7/2011 | Forbes, Jr. | 700/291 |
| 2011/0231044 A1 * | 9/2011 | Fassnacht | 701/22 |
| 2012/0035778 A1 * | 2/2012 | Kong | 700/295 |
| 2012/0158229 A1 * | 6/2012 | Schaefer | 701/22 |

FOREIGN PATENT DOCUMENTS

| | | |
|---|---|---|
| DE | 69315856 T2 | 7/1998 |
| DE | 102008042677 A1 | 4/2010 |
| WO | WO 2009014543 A1 | 1/2009 |

* cited by examiner

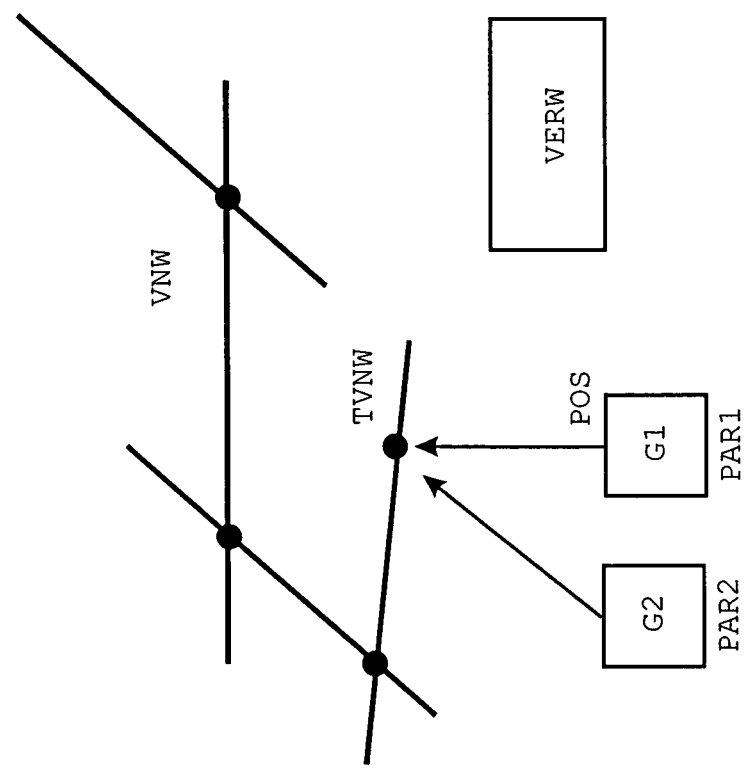

METHOD FOR CONTROLLING THE STABILITY OF AN ELECTRIC SUPPLY GRID

CROSS REFERENCE TO RELATED APPLICATIONS

This application is the US National Stage of International Application No. PCT/EP2011/057770 filed May 13, 2011, and claims the benefit thereof. The International Application claims the benefits of German Patent Application No. 10 2010 021 070.6 DE filed May 19, 2010. All of the applications are incorporated by reference herein in their entirety.

FIELD OF INVENTION

The invention relates to a method for controlling the stability of an electric supply grid. The method can preferably be used in electric supply grids, to which, in addition to conventional power generation plants, such as for instance coal-fired power plants, gas-fired power plants or nuclear power plants, power generation plants are also connected which feed temporally varying electrical energy into the supply grid. These plants include for instance wind power plants or solar power plant.

BACKGROUND OF INVENTION

It is intended that more renewable energy will be fed into existing electric supply grids. This portion is currently covered by the use of solar power and/or wind power.

Over the coming years or decades, the operation of hitherto gasoline or diesel-powered vehicles will at the same time change increasingly to electrical energy. The ensuing removal of electrical energy from the supply grid is therefore dependent on the consumer and thus fluctuates temporally.

The temporally varying feeding-in and removal of electrical energy into/from the grid inevitably results in stability problems in respect of the parameters frequency, phase, level of available electrical energy.

US 2009/0281673 A1 discloses a so-called "Smart Grid", in which the grid state is detected and controlled with the aid of an "intelligence" distributed over the grid, and in which energy distributed in the grid is stored.

WO 2009 014543 A1 discloses a further "Smart Grid", in which electrical energy is exchanged between the grid and a vehicle.

Both publications use a central control approach, in order to ensure the grid stability in respect of frequency and/or output.

This central control approach is however very prone to error on account of the complex control structures, which encompass large parts or the entire grid.

Temporally rapidly occurring changes to parts of the grid or a locally restricted consumer requirement can also not be detected correspondingly quickly and balanced out or regulated.

SUMMARY OF INVENTION

It is an object of the present invention to specify an improved method for controlling the stability of an electric supply grid.

This object is achieved by a method as claimed in the independent claim. Advantageous developments are specified in the dependent claims.

With the inventive method for controlling the stability of an electric supply grid, a first device, which is embodied to exchange electrical energy with the supply grid, determines, by way of its geographical location, a part of the supply grid, with which the first device is associated for energy connection. The first device determines parameters for an intended energy exchange. At least one second device associated with the same part of the supply grid for energy exchange determines parameters for an intended energy exchange. The first device performs the energy exchange by taking the parameters of the first and second device into account such that the electrical stability of the part of the supply grid is ensured.

In respect of the prior art, the load on a "Smart Grid" in use is reduced or replaced entirely with the aid of the present invention, since the required central control outlay is minimized.

The mode of operation of the exchange of parameters may take place in a manner comparable to that of known peer-to-peer communication.

Alternatively, it may also take place in a manner comparable to that of car-to-car communication, such as is used for instance for networked warning systems between motor vehicles (heavy goods vehicles).

Parameter sources for locally optimizing part of a grid may also be end consumers, node points and/or also external data sources for instance.

In the event in particular that electrical motor vehicles ("e-car") as a first device determine parameters, traffic management systems lends themselves as external data sources for instance. These allow the number of "e-cars" requiring electrical energy to be estimated across the flow of traffic.

Weather forecasts also allow for local reports about an expected flow of "e-car" traffic in the form of an external database. The energy requirement of "e-cars" will then change for instance on public holidays or workdays as a function of weather. The first and/or second parameters may be selected from this expected change of the power output and frequency in the supply grid in case of the energy exchange. The first and/or second parameters may also be selected from the output available in the supply grid, the frequency in the supply grid, and a combination thereof.

A customer forecasting system which estimates an expected energy requirement can also be used as an external database.

On account of the decentralized approach, no central control unit is needed, so that the grid has increased robustness and rapid control dynamics.

On account of the decentralized approach, the inventive method allows for the method to be gradually introduced into existing supply grids, and therefore to retrofit these gradually.

BRIEF DESCRIPTION OF THE DRAWINGS

The invention is described in more detail below with the aid of FIG. 1.

DETAILED DESCRIPTION OF INVENTION

In a first step, a first device G1, which is embodied to exchange electrical energy with a supply grid VNW, determines its geographical location POS.

In a second step, the first device G1 is associated with part TVNW of the supply grid VNW with the aid of the geographical location POS.

The position can be determined by way of GPS for instance. It can also be determined by way of signals, which are exchanged with a position of the supply grid VNW which is determined therefore by way of an electrical supply or connection cable.

The connection cable is preferably used here, which is provided for an intended energy exchange between the first device G1 and the supply grid VNW.

The first device G1 determines parameters PAR1 for an intended energy exchange and transfers the same to an administrative function VERW.

The administrative function VERW can be embodied as a central unit of the entire supply grid VNW. Or it is provided on an associated part of the supply grid VNW as one of several decentralized units.

At least one second device G2 which is associated with the same part of the supply grid TVNW for an energy exchange, similarly determines in a further step parameters PAR2 for an intended energy exchange.

These parameters PAR2 can be determined in a similar manner to the steps which are used by the first device G1 to determine the parameters PAR1.

In a further step the first device G1 performs the energy exchange by taking the parameters PAR1 of the first device G1 and the parameters PAR2 of the second device G2 into account such that the electrical stability of the part of the supply grid TVNW is ensured.

The electrical stability is evaluated for instance by the central administrative function or by the decentralized administrative function of the supply grid VNW.

It is however also possible to perform the evaluation of stability by means of a "master" device to be defined. The first device could assume this functionality as a "querying" device, provided the parameters required for assessing the stability of the supply grid part are conveyed thereto.

If the administrative function or also the first device establishes that the associated part of the supply grid has adequate electrical resources (e.g. output) available, then the first device then performs the intended energy exchange.

For instance, an e-car, as a first device, would recharge its empty batteries in this instance.

If however the administrative function or also the first device establishes that a large number of other devices (e.g. e-cars as second devices) are already connected to the associated part of the supply grid and already taking energy from the part of the supply grid, an estimation then takes place with the aid of the available parameters.

If still possible within the scope of the grid resources, an e-car, as a first device, will perform the intended energy exchange and recharge its empty batteries.

If this is no longer possible within the scope of the grid resources, the e-car, as the first device, will not immediately perform the intended energy exchange and may only recharge its empty batteries later.

The invention claimed is:

1. A method for controlling the stability of an electric supply grid, comprising:
    locating a supply grid by a first device via a geographical location of the first device, wherein the first device is embodied to exchange electrical energy with the supply grid,
    determining, by the first device, first parameters for an energy exchange with the supply grid,
    determining, by a separate second device associated with the supply grid, second parameters for an energy exchange with the supply grid, and
    exchanging electrical energy between the first device and the supply grid based upon the first and second parameters such that an electrical stability of the supply grid is ensured,
    wherein the first and/or second parameters are selected from the group consisting of an intended power exchange with the first and/or second device, a frequency in the supply grid, an output available in the supply grid, an expected change of the power output and the frequency in the supply grid in the case of the energy exchange, and a combination thereof.

2. The method as claimed in claim 1, wherein an end consumer, as the first device and/or as the second device, determines the first and/or second parameters for the energy exchange.

3. The method as claimed in claim 2, wherein the end consumer is an electrically-powered car.

4. The method as claimed in claim 1, wherein the second device is a power plant component.

5. The method as claimed in claim 1, wherein the first device exchanges the first and/or second parameters with the second device and/or with the supply grid by way of a connected power supply line.

6. The method as claimed in claim 1, wherein the first device performs the energy exchange by taking additional parameters of a network node point of the supply grid into consideration in order to ensure the electrical stability of the supply grid.

7. The method as claimed in claim 1, wherein an administrative function evaluates the stability of the supply grid based upon the first and second parameters of the first and second devices.

8. The method as claimed in claim 1, wherein a local control of at least one parameter of the supply grid is implemented using the first and second parameters.

9. The method as claimed in claim 1, wherein electrical energy is fed into the supply grid by way of connected power plants, wherein nuclear power plants, hydroelectric power plants, steam power plants and/or power plants with a temporally predictable energy output are used as power plants.

10. The method as claimed in claim 1, wherein electrical energy is fed into the supply grid by way of connected solar power plants and/or wind power plants.

11. The method as claimed in claim 1, wherein the location of the first and/or second device and/or the supply grid is determined with a connection cable which is provided for the energy exchange with the supply grid.

12. The method as claimed in claim 1, wherein the location of the first and/or second device and/or the supply grid is determined with a GPS or with a DGPRS or with a GPS-based system.

* * * * *